United States Patent [19]
Kimura

[11] Patent Number: 4,816,852
[45] Date of Patent: Mar. 28, 1989

[54] CAMERA

[75] Inventor: Hiroyuki Kimura, Kanagawa, Japan

[73] Assignee: Canon Kabushiki Kaisha

[21] Appl. No.: 70,108

[22] Filed: Jul. 6, 1987

Related U.S. Application Data

[63] Continuation of Ser. No. 912,178, Sep. 25, 1986, abandoned, which is a continuation of Ser. No. 694,225, Jan. 24, 1985, abandoned, which is a continuation of Ser. No. 347,048, Feb. 8, 1982, Pat. No. 4,504,131.

[30] Foreign Application Priority Data

| | | | |
|---|---|---|---|
| Feb. 13, 1981 | [JP] | Japan | 56-19608 |
| Feb. 24, 1981 | [JP] | Japan | 56-25851 |
| Feb. 24, 1981 | [JP] | Japan | 56-25852 |
| Feb. 24, 1981 | [JP] | Japan | 56-25853 |
| Feb. 24, 1981 | [JP] | Japan | 56-25854 |
| Feb. 25, 1981 | [JP] | Japan | 56-26608 |
| Feb. 26, 1981 | [JP] | Japan | 56-27299 |
| Feb. 26, 1981 | [JP] | Japan | 56-27300 |
| Feb. 26, 1981 | [JP] | Japan | 56-27301 |
| Feb. 27, 1981 | [JP] | Japan | 56-28173 |
| Feb. 27, 1981 | [JP] | Japan | 56-28174 |
| Mar. 5, 1981 | [JP] | Japan | 56-31521 |
| Mar. 5, 1981 | [JP] | Japan | 56-31522 |
| Mar. 5, 1981 | [JP] | Japan | 56-31523 |
| Mar. 5, 1981 | [JP] | Japan | 56-31524 |
| Mar. 11, 1981 | [JP] | Japan | 56-34898 |
| Mar. 11, 1981 | [JP] | Japan | 56-34899 |

[51] Int. Cl.⁴ .................................. G03B 1/12
[52] U.S. Cl. ....................... 354/173.1; 354/214
[58] Field of Search ..................... 354/173.1, 214

[56] References Cited

U.S. PATENT DOCUMENTS

| | | | |
|---|---|---|---|
| 4,251,148 | 2/1981 | Stemme et al. | 354/173.1 |
| 4,274,726 | 6/1981 | Yoneyama et al. | 354/173.1 |
| 4,342,509 | 8/1982 | Wakabayashi et al. | 354/214 X |
| 4,367,026 | 1/1983 | Terada et al. | 354/173.11 |

Primary Examiner—Michael L. Gellner
Attorney, Agent, or Firm—Toren, McGeady & Associates

[57] ABSTRACT

A camera in which a film is continuously taken up to a take up reel from a film magazine being loaded then the film is rewound one frame by one frame into the film magazine for making a photographing, wherein a feeding of the film is made by a driving power of a motor and at the same time power supply to the motor is controlled depending on a presence of a loaded film, a state of closing of a back lid, variation in a torque in a take up reel at a time of continuous taking up of the film, and an indication state of a film counter, etc., so that a handling and operation of a continuous take up, a continuous rewinding and one frame rewinding in a camera are made simple and reliable.

24 Claims, 9 Drawing Sheets

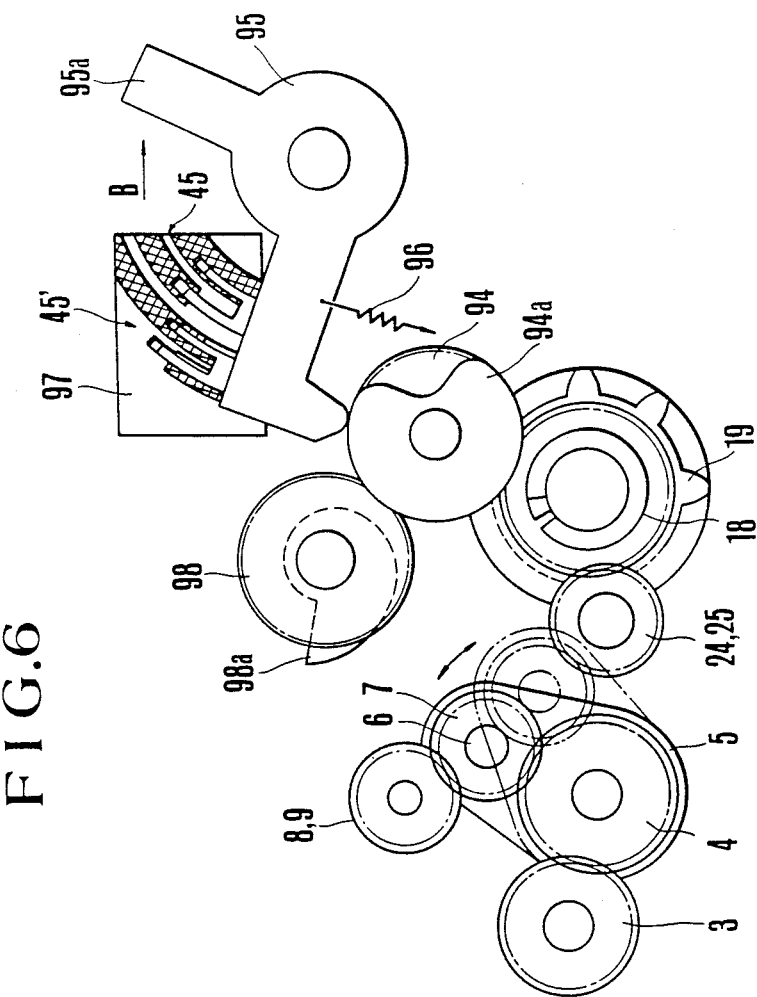

CAMERA

This is a continuation of application Ser. No. 912,178 filed Sept. 25, 1986, abandoned, which in turn is a continuation of application Ser. No. 694,225, filed Jan. 24, 1985, abandoned, which in turn is a continuation application of Ser. No. 347,048, filed Feb. 8, 1982, U.S. Pat. No. 4,504,131.

BACKGROUND OF THE INVENTION

1. Field of the Invention

The present invention relates to a camera in which a film is continuously taken up to a take up reel from a film magazine loaded in the camera, then the film is rewound one frame by one frame into the film magazine for making a photographing.

2. Description of the Prior Art

Heretofore, a camera in which a film is continuously taken up to a take up reel from a film magazine loaded in the camera, then the film is rewound one frame by one frame into the film magazine for making a photographing has been known, for example, by the Japanese Patent Application Publication No. Sho 55-10054 (Date of Publication: Mar. 13, 1980). However, since a continuous take up action and a one frame rewinding action is manually done in such a camera, it is necessary to separately provide an operating member to drive a take up reel at a time of a continuous take up action and an operating member to drive a magazine shaft at a time of one frame rewinding. Therefore, a driving power transmission means in a film feeding mechanism in such a camera becomes complicated, and a change over action of the operation of the camera becomes complicated, leaving great possibilities for erroneous handling and erroneous functioning.

Also, since the above-mentioned actions are done manually in such a camera, there are many disadvantages in use. That is, as each operating state is changed over by a photographer by manually making a continuous take up of a film and one frame rewinding in such a camera, unless the photographer is thoroughly familiar with operating procedures of the camera a correct operation of the camera is very difficult, also when the film is rewound for photographing, unless the photographer is very cautious about an amount of film left unexposed, there is such a possibility that a film leader portion which has already been exposed at a time of loading of the film into the camera (a portion which had been taken out of a film magazine preliminarily) is rewound for photographing. Therefore, in such conventional camera, a photographer has to always confirm a state of each operating member and an amount of film left unexposed which allows a photographing by a film counter, thus a handling of such a camera is very complicated.

SUMMARY OF THE INVENTION

The present invention is made in view of the above, and an object thereof is to provide a camera in which a feeding of a film is done by a driving power of a motor and a driving of said motor is controlled depending on a condition at the camera side, thus an operation of a camera is automatically controlled and a photographing is done as a film is being rewound in a reliable manner by a simple handling.

Another object of the present invention is to provide a camera in which a photographing is done as a film is being rewound and when a film rewinding is done up to a leader portion of the film the film is continuously rewound thereafter.

Still another object of the invention is to provide a camera in which a photographing is done as a film is being rewound and an operating state of the camera is totally changed over automatically from a loading of the film into the camera until a rewinding of the film is completed.

Further objects of the present invention shall be made apparent by detailed explanations of the embodiments to be shown below.

BRIEF DESCRIPTION OF THE DRAWINGS

FIG. 6 is a plan to show details of a power transmission mechanism in each example of the present invention.

DETAILED DESCRIPTION OF PREFERRED EMBODIMENTS

Figure 1:
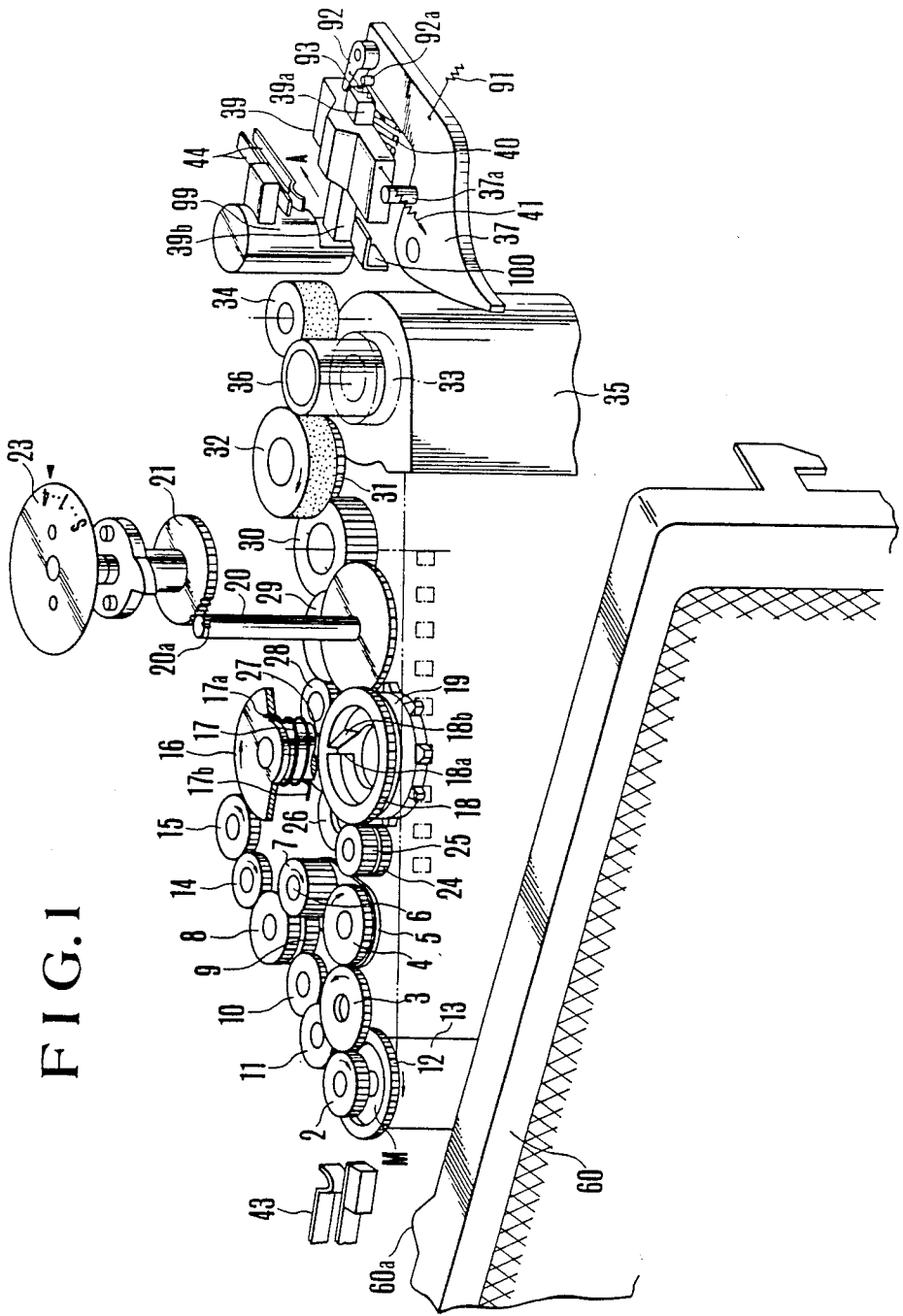
FIG. 1 is an oblique view to show a first example of a camera in which a photographing is done as a film is being rewound according to the present invention.

Now, detailed explanations of the present invention shall be made referring to the examples shown in the drawings.

In FIG. 1, what is represented by M is a driving motor having a gear 2 on its rotation shaft. What is shown as 3 is an idler to transmit a driving power of the motor M to a gear 4. What is shown as 5 is a lever which is supported at a supporting shaft of the gear 4 in a freely rotatable manner and is made rotatable independently of the gear 4, and a shaft 6 is fixedly provided at an end of said lever 5 and a clutch gear 7 which meshes with the gear 4 is attached to said shaft 6 in a freely rotatable manner. What are shown as 8 and 9 are gears engaging with the gear 7, and the gear 8 transmits a driving power to a sprocket system while the gear 9 transmits the same to a spool system. What are shown as 10 and 11 are idlers, and 12 is a spool gear meshing with the idler 11 and integrally rotate with the spool 13. What are shown as 14 and 15 are idlers and the idler 15 engages with a sprocket clutch gear 16. What is shown as 17 is a clutch spring having bent parts 17a and 17b, and the bent part 17a is inserted into a hole of the clutch gear 16 and is fixed thereat. What is shown as 18 is a sprocket gear and rotates co-axially with the clutch gear 16 and has a projection 18a and a cam part 18b at its inside. And the projection 18a is engageable with the bent part 17b of the clutch spring 17, while the cam part 18b is to shift the bent part 17b to upward direction in the drawing. Also the sprocket 8 is connected to a charging mechanism of a shutter or an automatic focusing detection device (AF) to be described below and to a motor control mechanism for advancing a film for a prescribed length. What is shown as 19 is a sprocket and rotates integrally with the sprocket gear 18, further engages with perforations of the film for making a film advancement for a prescribed length. What is shown as 20 is a counter driving gear meshing with the sprocket gear 18 and has a driving recess 20a. What is shown as 21 is a counter ratchet wheel which engages with the recess 20a and is so made as being advanced by one tooth by one rotation of the counter gear 20, and 23 is a counter scale plate. What are shown as 24 and 25 are gears so positioned as being able to engage with the clutch gear 7, and the gear 24 is for driving the film take up reel of the film magazine at a time of rewinding while the gear 25 is for driving the sprocket at a time of rewinding and meshes with the sprocket gear 18. What are shown as 26, 27, 28, 29 and 30 are driving idlers for driving the film take up reel of a magazine 35 at a time of rewinding. What is shown as 31 is a driving gear of a friction roller 32. The magazine 35 has a film take up reel 36 which is driven by friction rollers 32, 33 and 34. What is shown as 37 is a detection lever to detect a presence of a magazine and is pulled by a spring 91, and 39 is a change over knob being pulled by a spring 41. And a contact piece 40 which shifts while contacting a base plate (not shown) is attached in an electrically insulated state from the change over knob 39 to a bottom plane of said change over knob 39. Also said base plate has a connecting pattern similar to a base plate 79 to be described later in reference to FIG. 8.

Next, 92 is an engaging piece which is supported in a freely rotatable manner at a shaft planted at the detection lever 37 and is biased by a spring 93. And this engaging piece 92 engages with a restraint pin 92a in a state shown in the drawing and its rotation to the counterclockwise direction is restricted. What are shown as 39a and 39b are projections of the change over knob 39, wherein the projection 39a engages with the engaging piece 92 when the change over knob 39 is shifted to the direction of an arrow A, while the projection 39b engages with a shutter button 99 in a state shown in the drawing. Also, under the state shown in the drawing the change over knob 39 engages with a pin 37a planted on the detection lever 37 and have its shifting to a biased direction prohibited. Also, 44 is a switch which is closed by a pressing down of the shutter button 99, and 100 is a lever to release a binding of a shutter mechanism not being shown in the drawing to start a shutter operation, and 43 is a switch which is closed when a back lid 60 is closed.

Figure 9:
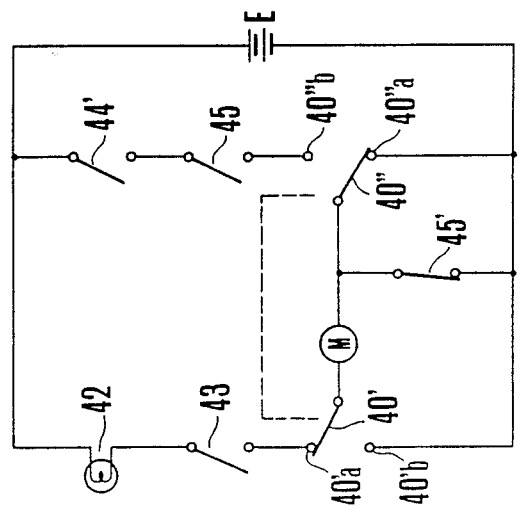
FIG. 9 is a circuit diagram to show a motor control circuit in the example shown in FIG. 1 and FIG. 2.

FIG. 9 shows a motor control circuit in the example shown in FIG. 1, and E shows a power source, and M represents a motor which rotates to a normal or a reverse direction depending on a power supply direction. What is shown as 42 is a display element (for example a lamp emitting light by power supply or a sound producing body such as a piezo-electric element may be used) connected between a switch 43 closed as the back lid 60 is closed and the power source E and 44' is a switch for retaining a power source being closed only during a prescribed sequence or for a prescribed period of time as a switch 44 is turned on by a pressing of a shutter button. Also, 45 is a switch connected to the switch 44', while 45' is a switch to short-circuit the motor M. By an arrangement shown in FIG. 6 to be described later, the switch 45 is closed as a rewinding for a prescribed length is started and is opened as the prescribed length rewinding is completed, while the switch 45' is opened by a start of the prescribed length rewinding and is closed as the prescribed length rewinding is completed being reverse to the manner of the switch 45'. What are shown as 40' and 40" are change over switches to be changed over by the contact piece 40 shown in FIG. 1, and there is a case wherein contact points 40'a and 40"a are contacted, or contact points 40'b and 40"b are contacted depending on a position of the change over knob 39, and a power supply direction to the motor M is changed over thereby.

Figure 3:
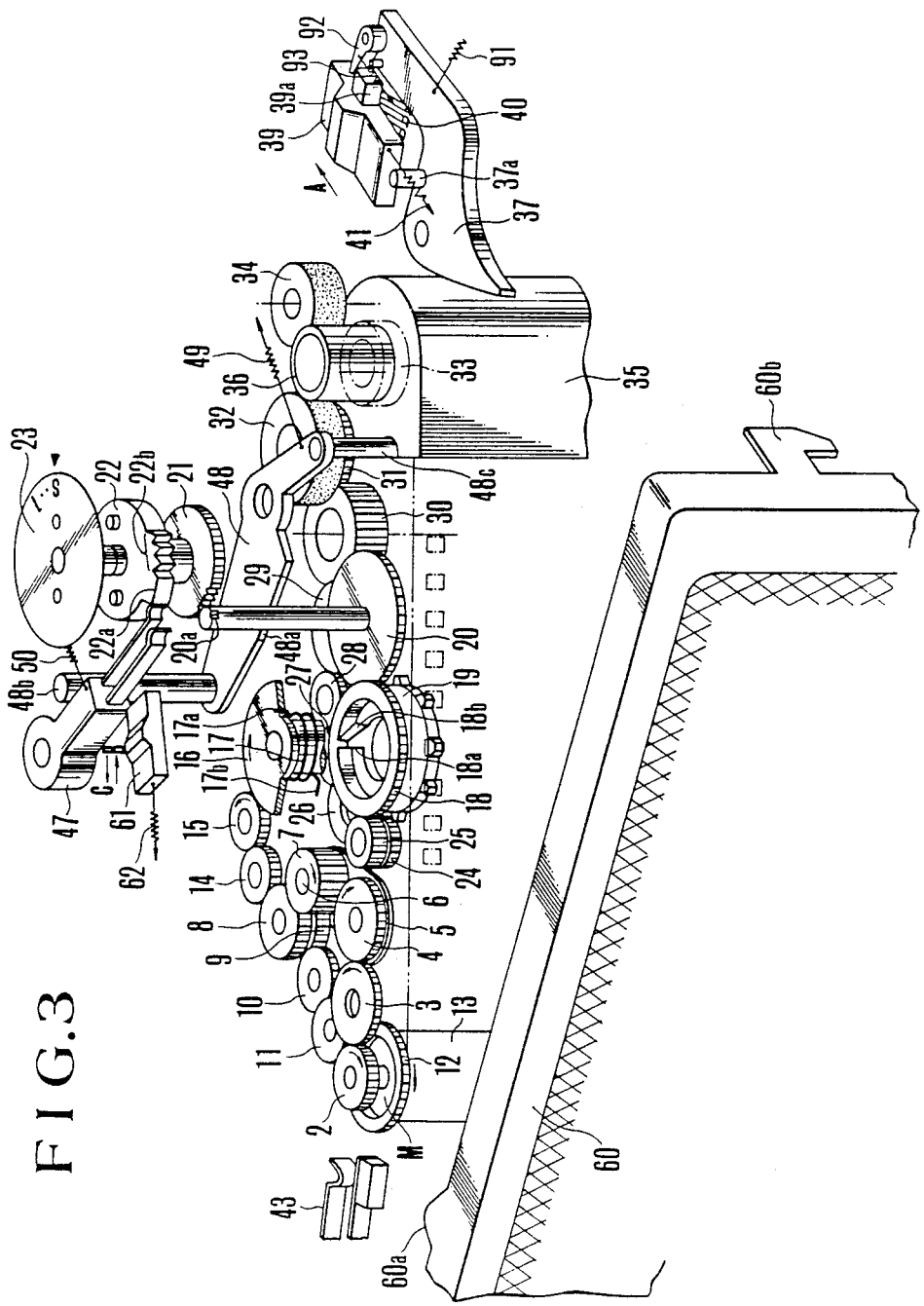
FIG. 3 is an oblique view to show a third example of the present invention.
Figure 4:
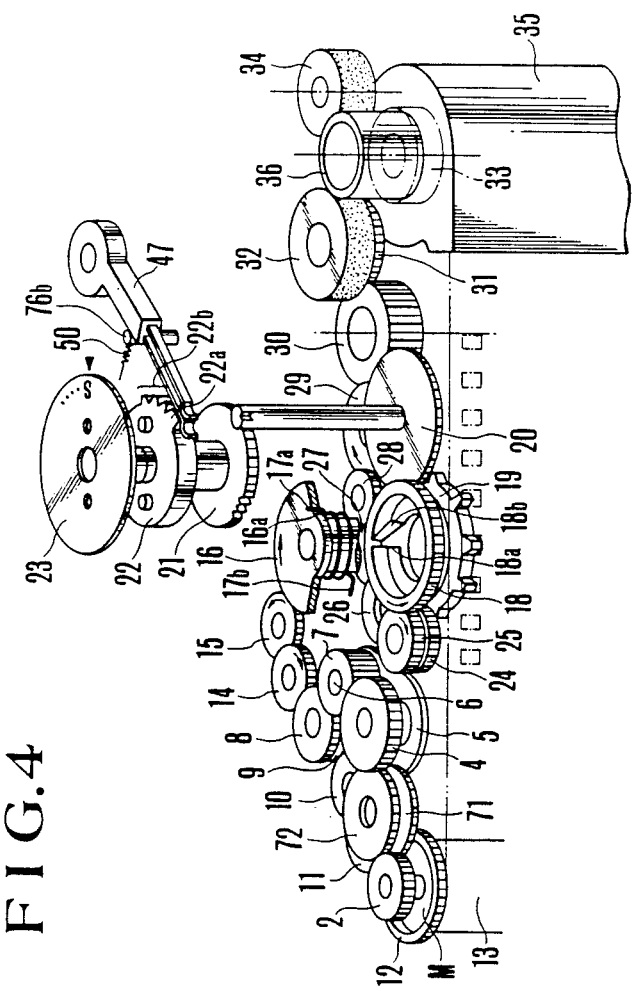
FIG. 4 is an oblique view to show a fourth example of the present invention.
Figure 5:
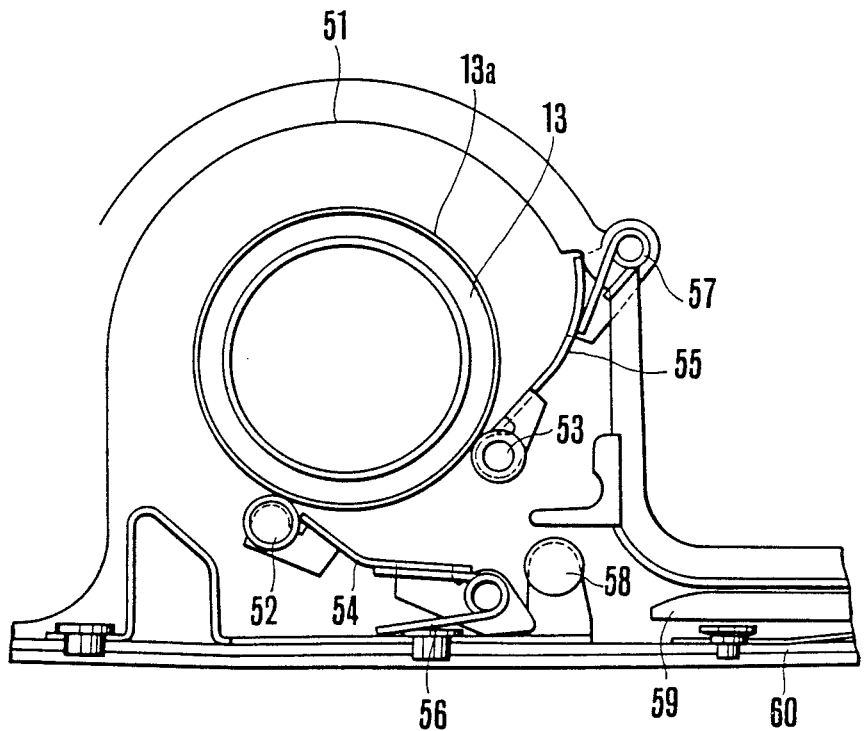
FIG. 5 is a plan to how a take up mechanism in each of the examples of the present invention.

FIG. 5 and FIG. 6 are to show a take up mechanism and a power transmission mechanism in each of the examples of FIG. 1 to FIG. 4. In FIG. 5, what is shown as 13 is a spool having a friction member 13a wound around the same, and 51 is a spool chamber inner wall, while 52 and 53 are rollers to guide the film having been fed to a circumference of the spool 13 and are axially supported at holding down members 54 and 55 respectively and are pressed against the spool 13 by springs 56 and 57. What is shown as 58 is a guide roller and 59 is a pressure plate.

Also in FIG. 6, what is shown as 94 is a prescribed length forwarding gear which is engageable with a sprocket wheel 18 and has a cam 94a provided at its upper part, and a prescribed length forwarding lever 95 being pulled by a spring 96 abuts on said cam 94a. Two pieces of contacting pieces are bonded to said prescribed length forwarding lever 95 in a state being electrically insulated from said lever, and as said contacting pieces prove while contacting with a base plate 97, thereby performing the function of the switches 45 and 45' shown in FIG. 9. A charging gear 98 of a shutter mechanism or an automatic focusing mechanism engages with the prescribed length forwarding gear 94, thus such arrangement is formed that a charging member not being shown in the drawing is actuated by a cam 98a provided below the same.

Next, explanations shall be made on the function of the first example having the above-mentioned structure.

When a film magazine 35 is not loaded into a camera, as the magazine detection lever 37 is rotated to the clockwise direction being pulled by the spring 91, the pin 37a provided on the detection lever 37 is made to escape, and the change over knob 39 is pulled by the spring 41, then the switches 40' and 40" (refer to FIG. 9) which are changed over by the contacting piece 40 come in touch with the contacts 40'b and 40"b. When the shutter button 99 is pressed under this state, the switch 44' is closed, then after the automatic focusing mechanism and the shutter mechanism are actuated a member (not being shown in the drawing) associated with a closing action of the shutter move the fore end 95a of the prescribed length forwarding lever 95 shown in FIG. 6, and the motor control switch 45 for forwarding a prescribed length of film is closed, thus the switch 45' is opened. By this current flows as E→44'→45→40"b→M→40'b→E, thus the motor rotates to the clockwise direction. By this the gear 4 also rotates to the clockwise direction and the lever 5 rotates to the clockwise direction, then the clutch gear 7 meshes with gears 24 and 25. By this the sprocket 19 and the friction rollers 32, 33, 34 rotate to a rewinding direction (a direction to feed the film towards the magazine 35). While the above action is being done, a charging of the shutter mechanism and the automatic focusing mechanism is done by the charging gear 98. And upon a completion of the charging of the shutter mechanism, in an association with the above-mentioned shutter closing action, a member which is not shown in the drawing but has rotated the prescribed length forwarding lever 95 to the clockwise direction is made to be evacuated. After that, as the prescribed length forwarding gear 94 makes one rotation the prescribed length forwarding lever 95 is rotated by the biasing power of the spring 96 so that it engages with the recess of the cam 94a, then the switch 45 is opened and a power supply to the motor M is stopped. At the same time, as the switch 45' is closed and a connection is made as M-40'b-45'-M, the motor is short-circuited and is suddenly stopped from the rotation which has been done by an inertia.

Next, as the magazine 35 is loaded under this state, the detection lever 37 is rotated to the counterclockwise direction by the magazine 35. At this time since the change over knob 39 is pushed by the pin 37a provided on the detection lever 37 and is moved to the direction A, the contacting piece 40 is also moved to the direction A on a base plate not being shown in the drawing and the switches 40', 40" are changed over from the contacts 40'b, 40"b to the contacts 40'a, 40"a. By this, a circuit for the clockwise rotation of the motor M is cut off and the state shown in FIG. 9 is secured, therefore even if the shutter button 99 is pressed to close the switch 44', power will not be supplied to the motor M. Therefore, such trouble will not take place that as the shutter button 99 is inadvertently pressed when the magazine 35 is loaded, the sprocket 19 and the friction rollers 32, 33, 34 rotate to the rewinding direction and the leader portion of the film is taken up into the magazine 35.

Also since the projection 39b of the change over knob 39 is moved to a position allowing it to be engaged with the notch in the shutter button 99 as the magazine 35 is loaded, the camera with said arrangement can not initiate an action of the shutter mechanism, etc. through the lever 100.

When a fore end of the film is placed on the spool 13, under this state, and the back lid 60 is closed, the switch 43 is closed by a projection 60a of the back lid 60, and current flows as E→42→43→40'a→M→40"a→E, thus the motor M is rotated to the counterclockwise direction. By this the gear 4 and the lever 5 also move to the counterclockwise direction and the clutch gear 7 meshes with the gears 8 and 9. By this the spool gear 12 and the sprocket clutch gear 16 rotate to such direction as winding up the film around the spool 13. Since the spool 13 has no power to pull the film at an initial stage of a film wind up, the sprocket 19 is driven to the clockwise direction as the bent part 17b of the clutch spring 17 wound to the sprocket clutch gear 16 pushes the projection 18a at the inside of the sprocket gear 18. By this the film is pushed into a spool chamber 51 and a fore end of the film is taken up into between the roller 52 and the spool 13. The fore end of the film which has passed the roller 52 once comes off the spool 13, but is pressed against the spool 13 again by the roller 53. The fore end of the film coming out of the roller 53 tends to come the spool 13 again, but as the next film has already been fed thereto, it goes under the roller 52 as being pressed against the spool 13. As the same process is repeatedly continued, the film is tightly wound to the spool 13 by a friction between the friction member 13a wound to a periphery of the spool 13 and the film.

Also, since a peripheral speed of the spool 13 in this example is so set as being faster than a peripheral speed of the sprocket 19 as being driven by the sprocket clutch gear 16, after the film has been wound to the sprocket 13, the peripheral speed of the projection 18a becomes faster than the peripheral speed of the bent part 17b, and the rotation of the sprocket clutch gear 16 is not transmitted to the sprocket 19. Therefore, after the film is wound around the spool 13 the film will be forwarded only by the rotating power of the spool 13. That is, under this state the sprocket 19 is not driven by the bent part 17b of the clutch spring 17, instead it is driven by the film, thus a so-called a spool drive will be done. Therefore, the bent part 17b of the clutch spring 17 may abut on the cam part 18b of the sprocket gear 18, but as the bent part 17b in this case comes over a slanted plane of the cam 18b resisting the biasing power of the clutch spring 17 and drops in a left hand side of the projection 18a, there will be no problems. Also, if such arrangement is employed that the peripheral speed of the spool 13 is so made as being slightly slower than the peripheral speed of the sprocket 19 and the peripheral speed of the spool 13 will become faster than the peripheral speed of the sprocket 19 when the film has been wound around the spool 13 and thus wound diameter of the spool 13 reaches a prescribed level, it is possible to make an initial portion of the film wind up by a sprocket driving, thus making the wind up in a sure and reliable manner.

Also, since power is supplied to the display element 42 during a period of time the motor M is making a continuous wind up, it can be confirmed by for example lighting up of a lamp, etc. that the camera is in a continuous wind up mode. And since the prescribed length forwarding gear 94 also rotates during the continuous wind up, the switches 45, 45' repeat an opening and a closing, therefore there will be a case when current flows as M→45'→E, but there will be no harm at all in practical point of view.

When the wind up of the film to the spool 13 is completed, as the change over knob 39 is further moved to the direction A, the projection 39b retracts from the position engaging with the notch of the shutter button 99 thus allowing an operation of the lever 100 by a shutter button, and at the same time the projection 39a moves, pushing the engaging piece 92 and the projection 39a and the engaging piece 92 so engage as stopping the change over knob 39 at a position resisting the biasing power of the spring 41. And by this, the switches 40' and 40" shown in FIG. 9 come in contact with the contacts 40'b and 40"b again, therefore the camera will be placed in a state that a photographing is made as the film is rewound into the magazine 35 one frame by one frame as in a case the magazine is not loaded in the camera. Also, operations in this case is same as in the case described before, therefore explanations therefor will not be repeated here.

Also, when the back lid 60 is opened after a photographing of all frames has been completed and the magazine 35 is taken out, the magazine detection lever 37 rotates to the clockwise direction by the biasing power of the spring 91, therefore the engagement of the engaging piece 92 with the projection 39a of the change over knob 39 is released. Therefore, the change over knob 39 returns to its initial position by the biasing power of the spring 41. Also in this case, while the switches 40' and 40″ momentarily come in touch with the contacts 40′a and 40″a respectively by the return of the change over knob, since the back lid 60 is opened and the switch 43 is opened, power will not be supplied to the motor M.

Figure 2:
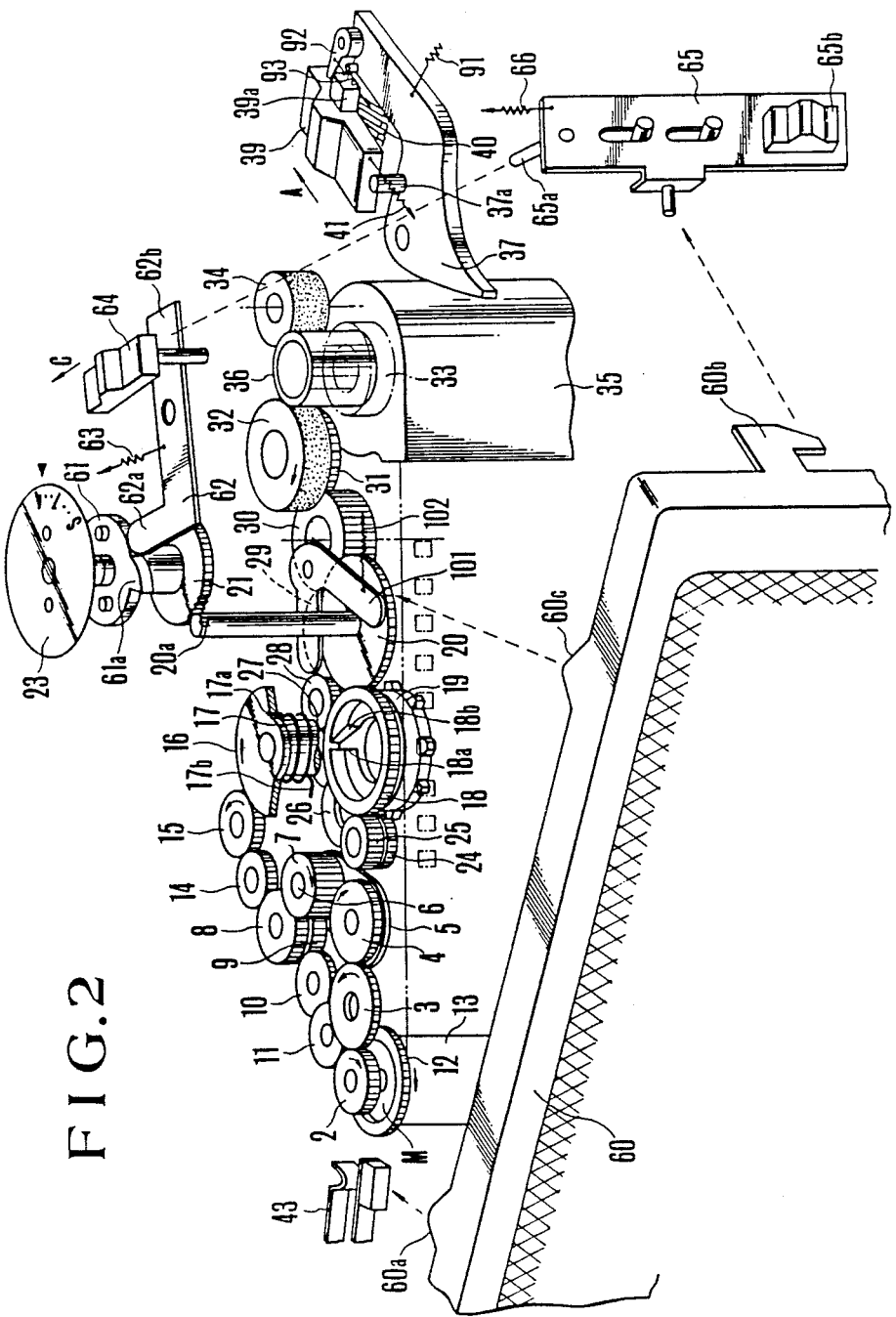
FIG. 2 is an oblique view to show a second example of the present invention.

Next, FIG. 2 shows the second example of the present invention, and is different from the example of FIG. 1 in that an opening and closing mechanism for the back lid 60 is added.

In this drawing, 23 is a counter scale on an upper plane of which figures indicating a number of film left unexposed are marked, and 61 is a cam integrally rotating with the counter scale 23, further a check lever 62 is so placed as engaging with the cam 61 and in a rotatable manner. This check lever 62 is pulled by a spring 63 and comes in contact with a periphery of the cam 61 at its fore end 62a. A claw 60b is formed at the back lid 60, and a back lid opening and closing member 65 which engages with the claw 60b to retain the back lid 60 at a closed position is so positioned as being able to be moved up and down against the camera main body. While the opening and closing member 65 is always pulled by a spring 66 and engages with the claw 60b of the back lid 60 to retain the back lid at the closed position, as it is pushed downward through an operating part 65b, it is released from the engaged state with the claw 60b to release the back lid. A pin 65a is integrally provided at said back lid opening and closing member 65.

The above-mentioned check lever 62 is rotated to the counterclockwise direction resisting a power of a spring 63 as its fore end 62a comes over the projection 61a of the cam 61 in a state the magazine 35 is not loaded or in a state the film has been rewound into the magazine 35, that is a state the counter scale 23 is at a position to indicate "S", but in a state the film has not been rewound into the magazine 35 that is in a state the counter has not been returned to the position S, the fore end 62a comes off the projection 61a of the cam and the check lever 62 rotates to the clockwise direction to have its end 62b come under a pin 65a of the above-mentioned opening and closing member 65. Thus, this check lever 62 blocks the movement of the back lid opening and closing member 65 in a state the film has not been rewound into the magazine 35. Also, a change over knob 64 which can be operated from outside is provided for releasing the blocking of the opening of the back lid 60 by said check lever 62 whenenven desired. That is, by moving the change over knob 64 to the direction C, a checking of the check lever 62 can be released.

Also while the counterclockwisely rotating power is given always to the counter scale 23 by a spring not being shown in the drawing, when the back lid 60 is closed a shaft fixed to the counter gear 20, by the force of a spring not shown, enters and engages between claw teeth of the counter ratchet wheel 21, thereby the counterclockwise rotation of the counter scale 23 is restricted. Also, the counter scale 23 is rotated as the counter ratchet wheel 21 and the recess 20a of the counter gear 20 engages with each other. What is shown as 101 is a counter returning lever being pulled by a spring 102 and as the back lid 60 is opened one end of said lever 101 presses the shaft fixedly provided to the counter gear 20 to release the engagement between the counter gear 20 and the counter ratchet wheel 21. What is shown as 60C is a projection provided at the back lid 60 and abuts on one end of the counter returning lever 101 to rotate said lever to the clockwise direction resisting the biasing power of a spring 102, when the back lid 60 is closed.

Also other parts and a motor control circuit in this example are same as those in the example of FIG. 1, thus explanations therefor will not be repeated here. Next, function of this example shall be explained.

When the magazine 35 is not loaded, as the magazine detection lever 37 is pulled by the spring 91 and rotates to the clockwise direction, the switches 40′ and 40″ shown in FIG. 9 come in touch with the contacts 40′b and 40″b as in the example previously mentioned above. Under this state, when a shutter button not being shown in the drawing of this example is pressed the switch 44′ is closed for a prescribed period of time and at the same time the switch 45 is closed while the switch 45′ is opened upon completion of the operations of the automatic focusing mechanism and the shutter mechanism, therefore current flows as E→44→45→40″b M→40′b→E, and the motor M rotates to the clockwise direction. And by this the gear 4 and the lever 5 rotate to the clockwise direction and the clutch gear 7 meshes with the gears 2, 25, then same operations as in the example of FIG. 1 will be done thereafter.

Now, when the back lid 60 is opened at this time the counter returning lever 101 is pulled by the spring 102 and rotates to the counterclockwise direction to release the engagement between the counter gear 20 and the counter ratchet wheel 21, therefore the counter scale 23 is retained at a position to indicate "S" (hereinafter referred to as S position). Also when the back lid 60 is closed, as the projection 60c of the back lid 60 presses the counter returning lever 101, the counter gear 20 and the counter ratchet wheel 21 engage with each other. And when a shutter button is pressed and the sprocket 19 moves to the rewinding direction, a rotation to a direction to be further rewound from the S position will be given to the counter ratchet wheel 21. However, as a stopper is provided at the counter ratchet wheel 21 although not being shown in the drawing to prevent its movement to be further rewound beyond the S position, therefore the counter scale 23 is retained at the S position as a result. In either case when the magazine 35 is not loaded the counter scale 23 will be at the S position, and a fore end 62a of the check lever 62 is retained in a state as coming over the projection 61a of the cam 61, therefore the other end 62b thereof comes off a locus of the pin 65a of the opening and closing member 65 thus a state in which the opening and closing member 65 can be moved is secured.

When the magazine 35 is loaded, after that, and the back lid 60 is closed to start a take up action of the film, the rotataion of the counter gear 20 is transmitted to the counter ratchet wheel 21, therefore the counter scale 23 and the cam 61 rotate to the clockwise direction according to the rotation of the sprocket 19. By this, the counter scale 23 indicates a number of frames of the film having been taken up to the spool 13, and the cam 61 has the engagement of its projection 61a and the fore end 62a of the check lever 62 released to rotate the check lever 62 to the clockwise direction. (The state shown in FIG. 2). Therefore at this time the other end 62b of the check lever 62 comes under the pin 65a of the opening and closing member 65 to prohibit the opening and closing of the back lid 60. Therefore, it is possible to prevent an accident that the back lid 60 opens inadvertently while the film is outside the magazine 35 exposing the film. Also, it is same as in the previously mentioned example that a photographing action is made while the film is rewound to the magazine 35.

Also when the magazine 35 is taken out in a course of photographing, as the change over knob 64 is moved to the direction C the check lever 62 moves to the counterclockwise direction and the fore end 62b of the check lever 62 will not block the movement of the opening and closing member 65, thus the back lid 60 can be opened. Further, when a photographing of all frames has been completed, the counter scale 23 is returned to the S position again and one end 62a of the check lever 62 comes over the projection 61a of the cam 61, therefore the engagement of the other end 62b thereof and the pin 65a is released, allowing an operation of the opening and closing member 65.

Also, while the above-mentioned example has such arrangement that under a state the film is not rewound into the magazine 35 the check lever 62 to block the movement of the opening and closing member 65 obtains a signal from the cam 61 associated with the counter, this check lever 62 may be so made as functioning by detecting a presence a film around an entrance of the spool chamber.

Next, FIG. 3 is to show the third example of the present invention, and in this example, 22 is a switch drum integrally rotated with the counter ratchet wheel 21, and 47 is a switch being biased to the counterclockwise direction by a spring 50, and an end thereof comes in contact with projections 22a, 22b of the switch drum 22, thereby closing the switch 47. Also, 48 is a detection lever which is biased to the counterclockwise direction by a spring 49 and has a detection pin 48c to detect a presence of the magazine 35, and a side plane 48a pressure contacting with a shaft part of the counter gear 20, as well as a pin 48b to rotate the switch 47 to the clockwise direction, and said lever 48 rotates to the clockwise direction from the state shown in the drawing by the biasing power of the spring 49 when the magazine 35 is not loaded. Also, at this time a meshing of the counter gear 20 and the counter ratchet wheel 21 is released while the switch 47 is rotated to the clockwise direction and the fore end thereof retracts from a position enabling the fore end of the same to contact with the projections 22a, 22b of the drum 22. What is shown as 61 is a change over knob which is operated from an outside to close the switch 47 and is biased to the direction of the arrow C by a spring 62.

Figure 10:
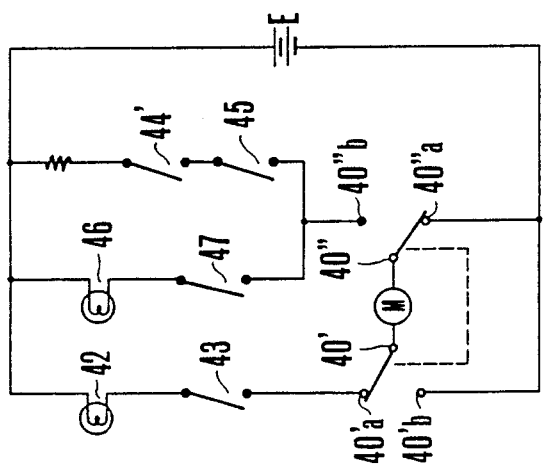
FIG. 10 is a circuit diagram to show a motor control circuit in the example shown in FIG. 3.

Also, FIG. 10 is a motor control circuit diagram in this example, and is different from the circuit of FIG. 9 in that a lamp 46 and a switch 47 are provided. That is, in this circuit the switch 47 of FIG. 3 is provided through the lamp 46 between the power source E and the contact 40"b of the switch 40", and a driving of the motor M can be controlled also by the switch 47. And as other arrangements are same as in the example of FIG. 1 described before, explanations therefor will not be repeated here.

Next, function of this example shall be explained.

When the magazine 35 is not loaded, since the magazine detection lever 37 is pulled by the spring 91 and is rotated to the clockwise direction, the pin 37a provided on the detection lever is made to be escaped and the change over knob 39 is pulled by the spring 41. Therefore, as the switches 40', 40" which are changed over by the contacting piece 40 come in touch with the contacts 40'b, 40"b, when a shutter button is pressed to close the switch 44' for a prescribed period of time and a photographing is done, current flows as E→44'→45→40"b→M→40'b→E as the photographing action is completed and the switch 45 is closed, then the motor M rotates to a direction of film rewinding. And when the cam 94a in such mechanism for forwarding a prescribed length of film as shown in FIG. 6 makes one rotation, the switch 45 becomes off and a driving of the motor M is stopped. Also at this time the detection lever 48 also rotates to the counterclockwise direction by a spring 49 and the meshing of the counter gear 20 and the counter ratchet wheel 21 is released by the side plane 48a, therefore the counter scale 23 is retained at the position S by a spring not being shown in the drawing. Therefore, even if the sprocket 19 rotates the rotation will not be transmitted to the counter ratchet wheel 21 and the counter scale 23 is left retained at the position S. Also since the switch 47 is rotated to the clockwise direction by a pin 48b of the detection lever 48, it is placed at position not contacting with the projections 22a, 22b. Further at this time the change over knob 61 is pulled by the spring 62 and is placed at a position not engaging with the switch 47. When the magazine 35 ia loaded, next, the detection lever 37 is pressed by the magazine 35 and rotates to the counterclockwise direction, and the change over knob 39 is pressed by the pin 37a and is moved to the direction A. By this, the contacting piece 40 is also moved and the switches 40', 40" come in touch with the contacts 40'a, 40"a. When the fore end of the film is placed on the spool 13 and the back lid 60 is closed, the switch 43 is closed by the projection 60a of the back lid and current flows as E→42→43→40'a→M→40"a→E, then the motor rotates to the counterclockwise direction, continuously winding up the film around the spool 13. Also function at this part is same as that in the example shown in FIG. 1. described above.

Also, since the detection lever 48 rotates to the clockwise direction resisting the biasing power of- the spring 49 when the magazine 35 is loaded, the counter gear 20 and the counter ratchet wheel 21 are in a meshed state at this time. Therefore, at the above-mentioned continuous film wind up, the rotation of the sprocket 19 is transmitted to the counter scale 23, and an indicated number of frames at the counter scale 23 increases according to a number of film frames having been advanced. Also the switch drum 22 rotates to the counterclockwise direction from the position shown in the drawing in an association with said counter scale 23.

On the other hand the switch 47 rotates to the counterclockwise direction by the loading of the magazine 35 and the fore end thereof is retained at a position allowing the same to contact with the projections 22a, 22b of the switch drum 22.

When a film wind up is completed, as the change over knob 39 is further moves to the direction A the knob 39 moves as its projection 39a pushes over the check pin 92, then after that even if the knob 39 is pulled by the spring 41 it is checked by the check pin 92, and the switches 40', 40" come in touch with the contacts 40'b, 40"b again. By this the camera makes same function as in a case when the magazine 35 is not loaded, thus a rewinding of the film one frame by one frame can be made as a photographing is being done. At this time the counter scale 23 is also rotated to the counterclockwise direction returning its indication one frame by one frame.

Figure 7A:
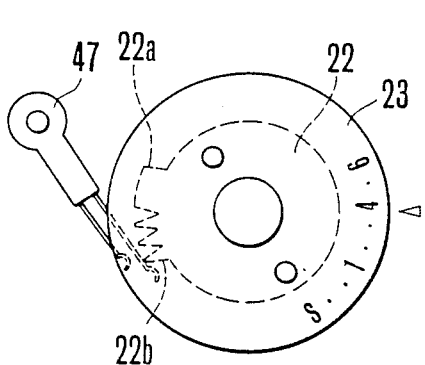
FIGS. 7(a), (b), (c) and (d) are plans to show function of the change over mechanism in the example shown in FIG. 3.
Figure 7B:
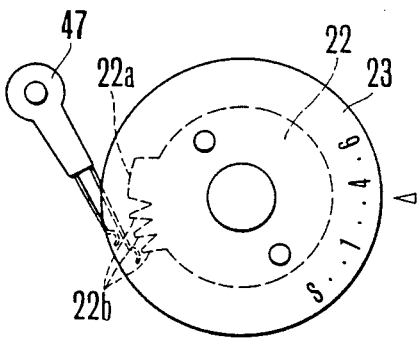
Figure 7C:
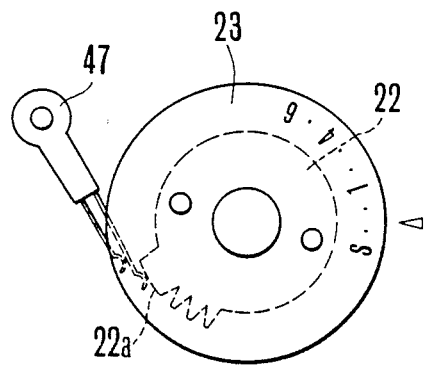
Figure 7D:
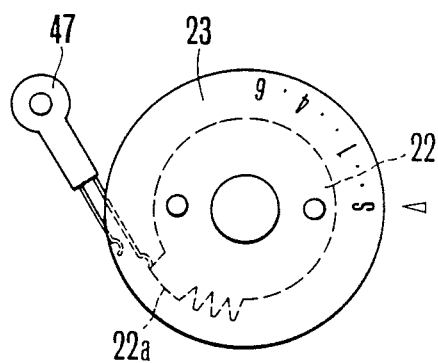

While the counter scale 23 is consecutively rotated as a photographing advances, the switch 47 is left opened until the counter scale 23 comes to a position shown in FIG. 7(a). However, as the photographing advances and a number of frames left unexposed becomes as an example three frames, the switch 47 comes over the projection 22b of the switch drum 22 as shown in FIG. 7(b) while the counter scale 23 is in operation, therefore the lamp 46 is lighted. Since the switch 47 is opened at this position before a rewinding of one frame is completed, power will not be left supplied to the motor M after one frame rewinding is completed. As the lamp 46 is lighted only when the counter scale 23 is in action as mentioned above, a warning that a number of frames left unexposed is small can be given thereby. When the film on which the photographing can be made has been used up, the switch 47 comes over the projection 22a of the switch drum 22 as shown in FIG. 7(c), therefore current flows as E→46→47→40″b→M→40′b→E and the lamp 46 is lighted and at the same time the motor M rotates making a continuous rewinding of the film leader portion. As the sprocket 19 also rotates during this time, the prescribed length forwarding switch 45 is opened and closed, there will be no effect on a power supply to the motor M. The continuous rewinding will be completed at a position at which the projection 22a of the switch drum 22 is finished then the prescribed length forwarding switch 45 is opened as shown in FIG. 7(d). By this a portion which has been exposed by the time the magazine is loaded is continuously rewound and at the same time it becomes possible to stop the rewinding immediately before the fore end of the film is taken up into the magazine.

As the back lid is opened and the magazine 35 is taken out after that the magazine detection lever 37 rotates to the clockwise direction, then the change over knob 39 is returned to its initial position by the biasing power of the spring 41 as the checking of the check pin 92 comes off. Also, at this time the detection lever 48 rotates to the counterclockwise direction by the biasing power of the spring 49, and the counter gear 20 is pressed by the side plane 48a of the detection 48 and has its meshing with the counter ratchet wheel 21 released, then the switch 47 is pressed by the fore end 48b of the detection lever 48 and is made to escape to a position not contacting with the projections 22a, 22b of the switch drum 22.

When it is desired to discontinue a photographing in a course and to continuously rewind the remaining film, the change over knob 61 is moved to the direction B then the switch 47 is closed and a same state as in the above-mentioned continuous rewinding is secured and a film rewinding is done. When the rewinding is completed and a finger is left off, the change over knob 61 is pulled by the spring 62 to the direction C and the switch 47 is opened stopping the motor M. By this it will not be necessary to press the shutter button for a number of frames left unexposed, thus simplifying the operation.

Next, FIG. 4 and FIG. 8 are to show the fourth example of the present invention, and is different from each of the preceeding examples in that a change over from an action of the continuous wind up to one frame rewinding is made automatically.

In these drawings (especially refer to FIG. 8), 71 and 72 are gears for torque detection being provided respectively in a freely rotatable manner and in a co-axial manner, wherein the gear 71 meshes with the gear 2 fixedly provided at a driving shaft of the motor, and the gear 72 meshes with the gear 4. Also, 73 is a spring to bias the gear 72 downward in the drawing to restrict a shifting of the gear 72 in the axial direction.

Figure 8A:
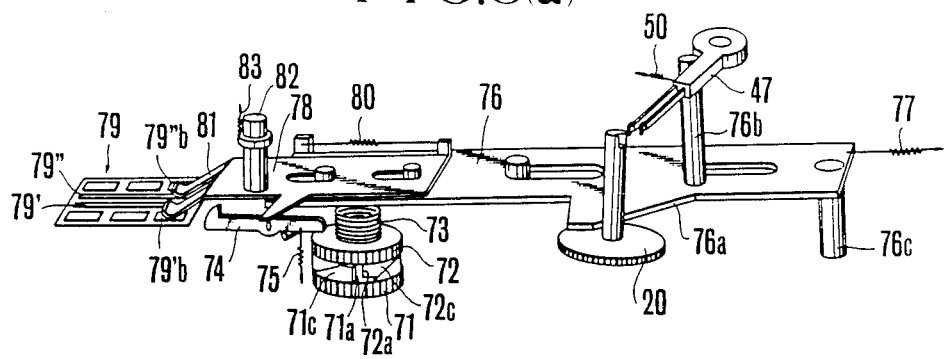
FIGS. 8(a), (b) and (c) are oblique views to show an example of the change over mechanism in the example shown in FIG. 4 and function thereof.
Figure 8B:
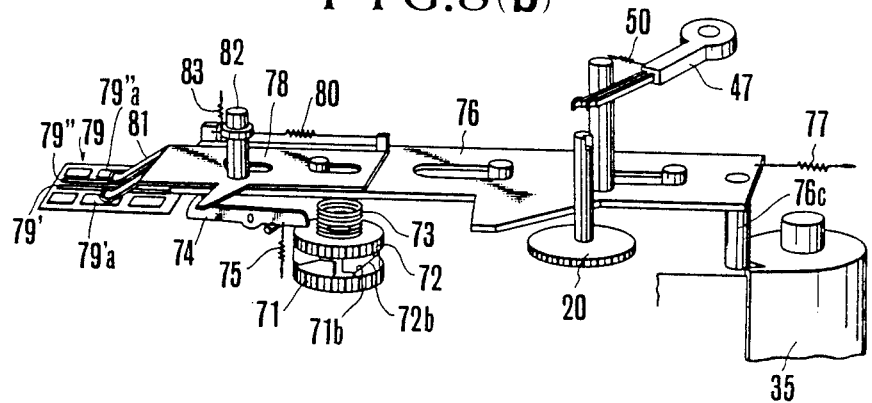

A projection 71c having an end plane 71a and a slanted plane 71b is formed at the torque detection gear 71 and at the same time a projection 72c having an end plane 72a and a slanted plane 72b is formed at the torque detection gear 72, and as the motor M further continues to rotate after a continuous wind up of the film is completed, the projection 72c of the torque detection gear 72 comes over the projection 71c of the torque detection gear 71 through each of the slanted planes 71b, 72b, thus the gear 72 is pressed up resisting the spring 73. What is shown as 76 is a magazine detection lever to detect a loading of the magazine 35 in the camera and this detection lever 76 is positioned at a right hand side in the drawing when the magazine 35 is not loaded as shown in FIG. 8(a), and when the magazine 35 is loaded in the camera, a pin 76c provided on the detection lever 76 engages with the magazine 35 and is retained at the position shown in the drawing as shown in FIG. 8(b). What is shown as 78 is a change over lever supported in a freely shiftable manner at the detection lever 76 and is biased to the left hand direction in the drawing by a spring 80 and is checked by a check lever 74 in a state shown in FIG. 8(b). This check lever 74 rotates to the counterclockwise direction resisting the biasing power of a spring 75 as the torque detection gear 72 is pushed upward, and releases the engagement with the change over lever 78.

A change over contacting piece 81 is provided at one end of the torque detection lever 78 and it comes in touch with each of contacts 79′, 79′a, 79′b, 79″, 79″a, 79″b as it is shifted along a base plate 79 in a manner as making a change over of a wind up mode and a rewinding mode, for varying a conductance state. What is shown as 82 is an operating button which rotates the check lever 74 at any desired time so that an engagement of the change over lever 78 and the check lever 74 can be released. This operating button 82 is biased upward in the drawing by a spring 83.

Figure 11:
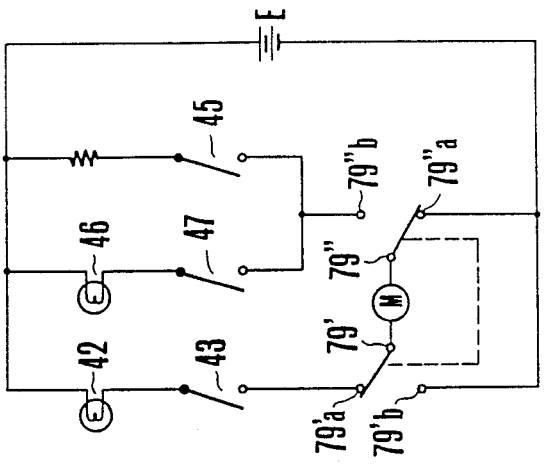
FIG. 11 is a circuit diagram to show a motor control circuit in the example shown in FIG. 4.

Also, FIG. 11 is a motor control circuit diagram in the above example, and in the drawing, E is a power source, and M is a motor. Also, 42 is a lamp and 43 is a switch being closed as a back lid is closed, while 45 is a motor control switch for prescribed length forwarding of the film, and is closed as the prescribed length rewinding is started, and is opened as the prescribed length rewinding is completed. What is shown as 46 is a lamp and 47 is a switch which is closed as it comes over the projections 22a, 22b of the switch drum 22 shown in FIG. 4. What are shown as 79′ and 79″ are switches to be changed over by the contacting piece 81 shown in FIG. 8, and there is a case wherein it comes to contacts 79′a, 79″a and there is a case wherein it comes to contacts 79′b, 79″b depending on the positions of the magazine detection lever 76 and of the change over lever 78.

And other arrangements are same as those in each of the examples described above, therefore explanations therefor will not be repeated.

Next, explanations will be made on a function of this example.

When the magazine is not loaded, as the magazine detection lever 76 is pulled by a spring 77 and is shifted to a right hand direction in the drawing as shown in FIG. 8 (a), therefore the contacting piece 81 of the change over lever 78 is positioned at a right hand side of a base plate 79 to connect the switch 79′ to the contact 79 b side and to connect the switch 79″ to the contact 79″b side. When a shutter button is pressed under this state the prescribed length forwarding switch 45 shown in FIG. 11 is closed after a photographing action is completed, and power flows as E→45→79"b→M→79'b→E, and the motor M rotates to the clockwise direction (a direction to rewind the film to the magazine 35). By this, the torque detection gear 71 rotates to the counterclockwise direction and as a projected end plane 71a of the torque detection gear 71 presses a projected end plane 72a of the torque detection gear 72, the torque detection gear 72 also rotates to the counterclockwise direction. By this the gear 4 rotates to the clockwise direction and at the same time the lever 5 rotates to the clockwise direction. And the clutch gear 7 meshes with the gears 24, 25 and the sprocket 19 and friction roller 32, rotate to a rewinding direction, and as the prescribed length forwarding cam 94a shown in FIG. 6 makes one rotation, the switch 45 is opened then power supply to the motor M is stopped. Since the engagement between the counter gear 20 and the counter ratchet wheel 21 has been released by a cam plane 76a of the magazine detection lever 76 at this time, the rotation of the sprocket 19 will not be transmitted to the counter scale 23. Also at this time, the switch 47 is rotated to the counterclockwise direction by a pin 76b planted on said lever, and the fore end thereof is retained at a position not contacting with the projections 22a, 22b of the switch drum 22.

Next, when the magazine 35 is loaded, as a pin 76c of the magazine detection lever 76 is pressed by the magazine 35 as shown in FIG. 8(b), the magazine detection lever 76 moves to a left hand direction. At this time the change over lever 78 also moves to a left hand direction in an association with said lever, and the change over lever 78 is checked by the check lever 74 at the position where the contacting piece 81 brings the switch 79' into contact with the contact 79'a, and brings the switch 79" into contact with the contact 79"a. Also, a biasing power is accumulated at the spring 80 by the shifting of the magazine detection lever 76 thereafter. And when the fore end of the film is placed over the spool 13 from said state and the back lid is closed, the switch 43 is closed and power flows as E→42→43→79'a→M→79-"a→E and the motor is rotated to the counterclockwise direction. By this the torque detection gear 71 rotates to the clockwise direction and as a slanted plane 71b of a projection 71c of the torque detection gear 71 presses a slanted plane 72b of a projection 72c of the torque detection gear 72, the torque detection gear 72 also rotates to the clockwise direction. By this the gear 4 and the lever 5 also move to the counterclockwise direction and the gear 7 meshes with the gears 8, 9. By this the spool gear 12 and the sprocket clutch gear 16 rotate to a direction to wind up the film around the spool 13.

Also a continuous film wind up action thereafter is same as that in the preceeding examples. Also, as the fore end of the switch 47 at this time is shifted to a position allowing a contact with the projections 22a, 22b of the switch drum 22, and at the same time the counter gear 20 and the counter ratchet wheel 21 are placed in a meshed state, an indicated number at the counter scale 23 increases according to a number of film frames taken up.

Figure 8C:
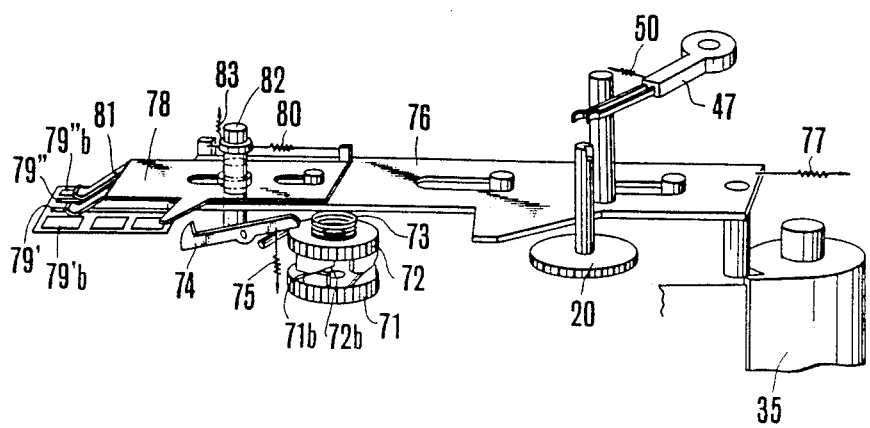

After that, when the film within the magazine 35 has been totally wound up, the rotation from the spool gear 12 to the torque detection gear 72 will be restricted, but as the motor M tends to rotate even at this time, the slanted plane 72b of the torque detection gear 72 rides over the slanted plane 71b of the torque detection gear 71 as shown in FIG. 8(c) resisting the spring 73, thus the torque gear 72 is pushed upward. Therefore, the check lever 74 rotates to the counterclockwise direction releasing the checking with the change over lever 78. By this the change over lever 78 is pulled by a spring 80 and moves to the left hand direction, thereby shifting a contacting piece 81 to the left hand end of a base plate 79 to close the contacts 79'b, 79"b again.

Now, when the cam 94a of FIG. 6 is not at a position of a prescribed length forwarding completion at this time, as the switch 45 is closed, the motor M rotates to the clockwise direction and the torque detection gear 71 rotates to the counterclockwise direction. By this, the torque detection gear 72 is pressed by the spring 73 and is shifted downward in the drawing in a manner sliding over the slanted plane 71b of the torque detection gear 71, and the projection end planes 71a, 72a contact with each other, then the torque detection gear 72 starts a rotation to the counterclockwise direction. By this the sprocket 19 and the friction rollers 32, 33, 34 rotate to a direction rewinding the film around the magazine 35, then when the cam 94a comes to a position a which the prescribed length rewinding is completed, the switch 45 is opened to stop the motor M. By this a photographing preparation is completed, then as a shutter button is pressed, the shutter and the AF mechanisms are actuated, thus a prescribed length rewinding of the film will be done.

And when the cam 94a happens to be at a position at which the forwarding of the prescribed length of film is completed at a moment the change over lever 78 moves, a shutter button is pressed and the above-mentioned change over of the gears is done at a time prescribed length of film is forwarded after the shutter and the AF mechanisms are actuated, then thereafter a photographing and one frame rewinding can be repeated. Also when it is desired to stop the continuous wind up of the film at a position at which a prescribed number of frames have been wound up, a button 82 is pressed to release the engagement of the check lever 74 and the change over lever 78 and to run the change over lever 78 to the left hand direction, then the above-mentioned change over will be done.

As a photographing proceeds and a number of frames left becomes for example three frames, the switch 47 rides over the projection 22b of the switch drum while the counter scale 23 is in action, (FIG. 7(b)) therefore the lamp 46 is lighted. However, since the switch 47 is opened before one frame rewinding is completed at this time, motor M will not be placed in a state power is supplied thereto even after one frame rewinding is completed.

Also when the counter scale 23 comes to a position to indicate that a number of photographable number of frames is nil the fore end of the switch 47 contacts with the projection 22a of the switch drum 22, FIG. 7(c)) therefore the 47 is closed, then power flows as E→46→47→79"b→M→79'b→E and the lamp 46 is lighted and at the same time the motor M rotates, thus a continuous rewinding will be done. As the sprocket 19 also rotates at this time, the switch 45 for forwarding a prescribed length of film is opened and closed, but there will be no influence over the power supply to the motor M. The continuous rewinding will be terminated at a position the projection 22a of the switch drum 22 is finished. By this a portion having been exposed by time the magazine is loaded is rewound and the fore end of the film is stopped immediately before it is taken up into the magazine.

After that as the back lid is opened and the magazine 35 is taken out the magazine detection lever 76 is pulled by the spring 77 and moves to the right hand direction in the drawing, then the contacting piece 81 returns to the right end part of the base plate 79.

At the same time the cam plane 76a and the pin 76b of the magazine detection lever 76 move to the right hand direction in the drawing, releasing the meshing of the counter gear 20 and the counter ratchet wheel 21, then the switch 47 comes outside of rotating radii of the projections 22a, 22b of the switch drum 22, thus the camera is placed in an initial state again.

As has been explained in detail, the present invention relates to a camera in which a photographing is done as a film is being rewound, wherein a feeding of the film, etc. is done by a driving power of a motor and a driving of said motor is controlled depending on conditions at the camera side, thus operations of such camera can be automatically controlled and a reliable and sure photographing can be made by a simple handling. That is the present invention is to control power supply to the motor depending on a presence of a film loaded, a state of opening and closing of a back lid, a variation in a torque of a take up shaft at a time of a continuous take up of the film, and an indication state of film counter, etc., thus all of the operations can be automated handling characteristics of such camera can be improved. Also according to the present invention the following effects can be expected:

(a) Power supply to the motor is changed over to a wind up direction and to a rewinding direction depending on a presence of a film loaded, and when the power supply direction turns to the wind up direction by the loading of the film, the power supply is started by closing of a back lid, therefore there will be no possibility that the film is pulled out of a magazine with the back lid left open at a time the film is loaded resulting in an inadvertent exposure of the film or a leader portion of the film is rewound into the magazine by an erroneous handling of a shutter button.

(b) As it is indicated that the power is being supplied to the motor, a photographer can easily notice that the camera is in operation.

(c) At an initial stage of film wind up the film is advanced by a sprocket driving, then the film is advanced by a spool driving after the film has been wounded around the spool, therefore a photographing preparation can be made without damaging the film.

(d) At a time of a continuous wind up of the film that is when a preparation for a photographing is done, a locking of a shutter button is done, thus a double exposure of the film can be prevented.

(e) Since an opening and a closing of a back lid is made possible depending on an indication by a counter, an erroneous exposure of the film can be prevented.

(f) When an exposed portion of the film is rewound, as the magazine is loaded, according to a photographing action, the film is continuously rewound into the magazine and said continuous rewinding is stopped in a state a fore end of the film is somewhat coming out of the magazine, thus there will be no fear that a photographing is done at a portion having been already exposed at a time of film loading.

(g) Also, it is indicated that a number of frames of the film allowing a photographing is small at a position a prescribed number of frames are still left unexposed before the above-mentioned state takes place, therefore a photographer does not have to exercise care always on a number of frames left, thus a handling characteristic can be improved.

(h) A change over from a continuous wind up to one frame rewinding is done by detecting a change in a torque of a take up shaft and at the same time restoration of the change over means to the initial position is done according to the take out of the magazine, thus a handling of a camera in which a photographing is done as a film is rewound can be made further simpler.

What is claimed is:

1. A camera in which a film loaded therein is first continuously taken up and then photographs are taken as the film is rewound frame by frame, comprising:
    (a) electric driving means for taking up and rewinding said film;
    (b) detection means a for detecting loading of the film, and for preventing said electric driving means from performing the continuous take-up operation when the loading of film is not detected thereby;
    (c) a film charging lid arranged to be opened and closed;
    (d) operating means for opening and closing said film charging lid;
    (e) counter means for indicating a number of frames of the film; and
    (f) prohibiting means for prohibiting the opening of said film charging lid by said operating means when said counter is in a predetermined state.

2. A camera according to claim 1, further comprising release means for releasing the prohibiting action of said prohibiting means from outside of the camera.

3. A camera according to claim 1, wherein said detection means includes control means for effecting a photographic preparation operation by a shutter release when the loading of film is not detected.

4. A camera in which a film loaded therein is first continuously taken up and then photographs are taken as the film is rewound frame by frame, comprising:
    (a) electric driving means for taking up and rewinding said film;
    (b) detection means for detecting loading of the film, and for preventing said electric driving means from performing the continuous take-up operation when the loading of film is not detected thereby;
    (c) a film charging lid arranged to be opened;
    (d) operating means for opening said film charging lid; and
    (e) prohibiting means for prohibiting the opening of said film charging lid by said operating means when the film has been wound more than a predetermined amount.

5. A camera according to claim 4, wherein said detection means includes control means for effecting a photographic preparation operation by a shutter release when the loading of film is not detected.

6. A camera according to claim 4, further comprising release means for releasing the prohibiting action of said prohibition means from outside of the camera.

7. A camera in which a film loaded therein is first continuously taken up, and then photographs are taken as the film is rewound frame by frame, comprising:
    (a) electric driving means for taking up and rewinding said film;
    (b) control means for causing said electric driving means to perform the continuous rewinding operation of the film when the frame by frame rewinding has been done until no frame is left for further photography; and (c) warning means for warning in case that the number of frames of the film left for a further photography has reached a prescribed number other than zero.

8. A camera according to claim 7, wherein said warning means includes indication means for producing a flickering indication.

9. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding is done until no frame is left for a further photograph; and (c) stopping means for stopping said electric driving means before ar forward end of the film is drawn into a cartridge.

10. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame rewinding has been done until no frame is left for a further photography; and (c) operating means for having said electric driving means perform the continuous rewinding operation from outside of the camera.

11. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding has been done until no frame is left for a further photograph; and (c) indication means for indicating a continuous take-up operation by said electric driving means while the operation is being performed.

12. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding has bene done until no frame is left for a further photography;

(c) a spool and sprocket to which the driving force is transmitted when said electric driving means performs the continuous take-up operation; and (d) clutch means for prohibiting the transmission of the driving force to said sprocket from said electric driving means when the speed of the film wound around said spool is faster than the peripheral speed of said sprocket.

13. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding has been done until no frame is left for a further photography;

(c) a spool for winding the film therearound; and (d) a friction member provided around said spool for tightening the film winding.

14. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding is done until no frame is left for a further photography; and (c) operating means for enabling the operation of the drive control of said electric driving means from outside of the camera.

15. A camera according to claim 14, wherein said operating means includes holding means for maintaining the operation condition.

16. A camera according to claim 15, wherein said operating means includes changeover means for switching over said electric driving means from a winding mode to a rewinding mode.

17. A camera according to claim 15, wherein said operating means is associated with said detection means for detecting loading of the film.

18. A camera in which a film loaded therein is first continuously taken up, and then photographs are taken as the film is rewound frame by frame, comprising:

(a) electric driving means for taking up and rewinding said film;

(b) control means for causing said electric driving means to perform a continuous rewinding operation of the film when the frame by frame rewinding is done until no frame is left for a further photography;

(c) a spool for wining the film; and (d) guide means for guiding the film to said spool.

19. A camera in which a film loaded therein is first continuously taken up, and then photographs are taken as the film is rewound frame by frame, comprising (a) electric driving means for taking up and rewinding said film;

(b) changeover means for detecting completion of the continuous take-up operation of the film and changing over the operation of the electric driving means from the continuous take-up operation to the frame by frame rewinding operation; and (c) warning means for warning in case that the usable number of frames of usable film left for a further photography has reached a prescribed number other than zero.

20. A camera according to claim 19, wherein said warning means includes indication means for producing a flickering indication.

21. A camera in which a film loaded therein is first continuously taken up, and then photographs are taken as the film is rewound frame-by-frame, comprising:

(a) electric driving means for taking up and rewinding said film;
(b) response means for responding to the take-up of the film;
(c) indication means for indicating the number of the film frames to be driven in response to the response means; and
(d) control means for continuously driving said electric driving means to the rewinding side until said response means gets into a predetermined state in response to completion of the continuous take-up.

22. A camera according to claim 21, wherein said response means includes a rotary body.

23. A camera according to claim 22, wherein said rotary body is arranged so as to rotate in association with the movement of the film.

24. A camera according to claim 22, wherein said rotary body is arranged so as to be associated with the indication means.

* * * * *